United States Patent [19]

Narayan

[11] Patent Number: 4,636,530
[45] Date of Patent: Jan. 13, 1987

[54] ISOCYANATE TERMINATED QUASI-PREPOLYMERS USEFUL FOR PREPARING URETHANE-GROUP-CONTAINING POLYISOCYANURATE FOAMS HAVING LOW FRIABILITY

[75] Inventor: Thirumurti Narayan, Grosse Ile, Mich.

[73] Assignee: BASF Corporation, Wyandotte, Mich.

[21] Appl. No.: 801,334

[22] Filed: Nov. 25, 1985

[51] Int. Cl.$^4$ ............................................. C08G 18/14
[52] U.S. Cl. ..................................... 521/159; 521/902; 528/83
[58] Field of Search .................. 521/159, 902; 528/83

[56] References Cited

U.S. PATENT DOCUMENTS 4,346,229  8/1982  Derr et al. ........................... 521/172
4,444,918  4/1984  Brennan .............................. 521/173

Primary Examiner—Maurice J. Welsh
Attorney, Agent, or Firm—William G. Conger; Joseph D. Michaels

[57] ABSTRACT

Flame retardant intumescent polyisocyanurate rigid foams are prepared by trimerizing isocyanate-terminated quasi-prepolymers containing predominately urethane linkages prepared by reacting an organic polyisocyanate with polyester polyols derived from the transesterification of dimethyl terephthalate process residue. The solvent blown rigid polyisocyanurate foams have exceptionally low friability.

13 Claims, No Drawings

ISOCYANATE TERMINATED QUASI-PREPOLYMERS USEFUL FOR PREPARING URETHANE-GROUP-CONTAINING POLYISOCYANURATE FOAMS HAVING LOW FRIABILITY

BACKGROUND OF THE INVENTION

1. Field of the Invention

The present invention relates to isocyanate-terminated quasi-prepolymers which are compatible with non-reactive blowing agents and to polyisocyanurate foams prepared therefrom. The quasi-prepolymers of the subject invention are prepared by reacting a stoichiometric excess of one or more organic isocyanates with a polyester polyol derived from the transesterification of dimethyl terephthalate process residue. The polyisocyanurate foams prepared from these quasi-prepolymers have exceptionally low friability.

2. Description of the Related Art

Rigid foams derived from polyisocyanate addition polymerization continue to be an important and expanding segment of the polyurethane industry. These rigid foams may be prepared by numerous methods resulting in foams having a wide variety of physical and chemical properties. One of the most important areas of application of rigid foam produced by polyisocyanate addition polymerization is in the area of foamed-in-place insulation. Such insulation is commonly found in refrigerator and freezer cabinets, chest-type coolers, refrigerated tractor-pulled trailers, and building panels and insulated doors. Increasing amounts are being utilized in buses, trains, and, particularly, in aircraft construction where the high insulating capacity is combined with the suitable physical properties to produce a variety of structural components.

Because of the types of applications which rigid foams lend themselves to, the flame or fire resistance of these foams has become a well recognized concern. While it is obviously impossible to render any organic material completely flame or fire-proof, much research has been done in order to increase the fire resistance of such foams.

A moderate degree of success has been accomplished by the addition of halogen-containing flame retardants, for example. These flame retardants are available commercially in both reactive and non-reactive forms. The reactive forms, often in the form of a halogenated polyether, polyester or polyester-ether polyol, are incorporated chemically into the foam, and are essentially non-volatile. The non-reactive flame retardants, on the other hand, are physically incorporated and generally are effective to impede initial flammability only, being volatilized at higher temperatures. Despite the incorporation of significant amounts of such flame-retardants, rigid foams are often too flammable for many uses for which they would otherwise be suitable. Further increasing the amount of flame retardant has proven to be unsuccessful, as the resulting foams have poor physical properties, particularly with regard to friability.

Another method of altering the flammability characteristics of rigid foams produced by polyisocyanate addition polymerization is to change the polymer linkages produced in the polymerization process. For example, foams containing predominately urethane linkages—polyurethane foams—are generally the most flammable. These foams are generally prepared by reacting nearly stoichiometric equivalents of hydroxyl-functional polyol and isocyanate in the presence of a urethane promoting catalyst, a blowing agent, and surfactant. The polyols utilized to produce rigid polyurethane foams generally have a functionality of three or more.

Foams containing significant quantities of urea linkages can be prepared by the substitution of polyamines in place of the conventional, urethane forming hydroxyl-functional polyols. Unfortunately, these polyamines, due to the substantially higher reactivity of the amino group compared to the hydroxyl group results in very rapid polymerization which is difficult to control.

Foams containing carbodiimide linkages may be produced by using catalysts which promote carbodiimide formation, or by using carbodiimide modified isocyanates. However these methods, while producing more flame resistant foams having superior physical properties, have not been utilized commercially to any great extent, partially due to the high cost of the starting materials, for example the carbodiimide modified isocyanates.

Perhaps the most successful of the fire-resistant rigid foams produced by polyisocyanate addition polymerization are the polyisocyanurate foams. These foams are made by trimerizing an organic isocyanate in the presence of a blowing agent and a suitable trimerization catalyst. Because these foams may be made without any polyol component, the resulting foam is generally superior to other polyisocyanate addition polymer foams in flame retardancy. The flame retardancy of the polyisocyanurate foams may be increased further by the addition of traditional flame retardants. When reactive flame retardants are added, either a polyisocyanurate-urethane or polyisocyanurate-urea foam is produced depending on the functional group type of the reactive flame retardant.

An improvement in the flame retardancy of all polyisocyanate addition polymer foams can be achieved if a "char former" is present. A char former is an ingredient which assists in the formation of an intumescent char on the outside of burning foam. The char not only slows flame spread, but it also serves as an insulator, shielding the inside of the foam from the heat of the fire.

In U.S. Pat. No. 4,237,239 is disclosed the preparation of polyisocyanurate foams wherein small amount of a crude polyester polyol derived from the process residue from dimethylterephthalate (DMT) bottoms is reacted with an organic isocyanate in the presence of a blowing agent and a trimerization catalyst. While the resulting polyisocyanurate-urethane foams contain minor amounts of urethane linkages which would ordinarily increase combustibility, the foams readily form an intumescent char which significantly decreases both the flammability and the amount of smoke evolved while burning.

However the process disclosed by U.S. Pat. No. 4,237,239 is difficult to implement as it requires as many as five different feeds into the mixing head due at least in part to the incompatibility of the very polar DMT derived polyester and the halocarbon blowing agent. Furthermore, the polyisocyanurate foams produced are quite friable, with weight losses, as measured by ASTM test method C-421. generally in excess of 24 percent, despite appreciable urethane-group content.

U.S. Pat. No. 4,425,444 discloses a process for the preparation of urethane-modified polyisocyanurate foams in which special surface active, amine-initiated polyoxyalkylene polyether polyols are added to the dimethylterephthalate derived polyester polyols to achieve compatibility with freon. The polyol mixture thus prepared is stable to separation for periods of greater than seven days. However the large proportion of urethane groups present in these urethane-modified polyisocyanurate foams, while significantly decreasing friability, cause the foams to be much less flame retardant than polyisocyanurate foams having a higher proportion of isocyanurate linkages.

SUMMARY OF THE INVENTION

It has now been surprisingly discovered, that isocyanate-terminated polyurethane group-containing quasi-prepolymers may be prepared from dimethylterepthalate derived polyester polyols and conventional isocyanates, which are storage stable, compatible with halocarbon blowing agents, and which can be polymerized in the presence of trimerization catalysts to form polyisocyanurate foams having excellent flammability characteristics and, at the same time, exceptionally low friability. These often conflicting properties had, until now, been difficult to achieve with the polyisocyanurate addition polymerization processes known to the art.

DESCRIPTION OF THE PREFERRED EMBODIMENTS

The isocyanate-terminated quasi-prepolymers of the subject invention are prepared by reacting together one or more organic isocyanates with a polyester derived from dimethylterephthalate process residue through transesterification with an aliphatic diol, polyol, or alkanolamine.

By the term organic isocyanate is meant organic isocyanates having a functionality of two or higher. For example, organic diisocyanates, polyisocyanates, or mixtures thereof may be used successfully. The organic isocyanates may be aliphatic, cycloaliphatic, alicyclic, aromatic or aromatic aliphatic isocyanates. The various isocyanates suitable for the preparation of the quasi-prepolymers of the invention are well known to those skilled in the art.

Among the many isocyanates suitable for the practice of the subject invention are, for example, aliphatic isocyanates such as tetramethylene, hexamethylene, octamethylene and decamethylene diisocyanates, and their alkyl substituted homologs; cycloaliphatic isocyanates such as 1,2-, 1,3- and 1,4-cyclohexane diisocyanates, 2,4- and 2,6-methylcyclohexane diisocyanates, 4,4'- and 2,4'-dicyclohexyldiisocyanates, 4,4'- and 2,4'-dicyclohexylmethane diisocyanates, 1,3,5-cyclohexane triisocyanate, and saturated (hydrogenated) polymethylenepolyphenylenepolyisocyanates; alicyclic isocyanates such as isocyanatomethylcyclohexane isocyanates, isocyanatoethylcyclohexane isocyanates, bis(isocyanatomethyl)cyclohexane diisocyanates, 4,4'- and 2,4'-bis(isocyanatomethyl)dicyclohexane, and isophorone diisocyanate; aromatic isocyanates such as 1,2-, 1,3-, and 1,4-phenylene diisocyanates, 2,4- and 2,6-toluene diisocyanate, 2,4'-, 4,4'-, and 2,2'-biphenyl diisocyanates, 2,2'-, 2,4'- and 4,4'-diphenylmethane diisocyanates, and polymethylenepolyphenylenepolyisocyanates (polymeric MDI); and aromatic aliphatic isocyanates such as 1,2-, 1,3-, and 1,4-xylylene diisocyanates.

Organic isocyanates containing heteroatoms may also be utilized, for example those derived from melamine. Preferred, however are the aromatic diisocyanates and polyisocyanates. Particularly preferred are 2,4-, and 2,6-toluene diisocyanate and mixtures thereof, 2,4'-, 2,2'- and 4,4'- diphenylmethane diisocyanate, polymethylenepolyphenylenepolyisocyanates, and mixtures of the above preferred isocyanates.

Particularly preferred are commercially available isomer mixtures of toluene diisocyanate (TDI), commonly available in isomer ratios of (65:35 and 80:20, for example) and polymeric MDI.

Examples of the dimethylterephthalate derived polyester polyols are those polyester polyols derived from the distillation of process bottoms involved in dimethylterephthalate (DMT) manufacture, by transesterification with aliphatic polyols. Suitable DMT polyester polyols, for example, are disclosed in U.S. Pat. No. 3,647,759 wherein residue derived from DMT production via air oxidation of p-xylene is utilized. The oxidate residue contains a complex mixture of polycarbomethoxy substituted diphenyls, polyphenyls, and benzyl esters of the toluate family. This residue is transesterified with an aliphatic diol such as ethylene glycol, propylene glycol, diethylene glycol, dipropylene glycol, and the like to produce a variety of low cost, predominately hydroxyl-functional polyester polyols with a wide variety of physical properties. Such DMT derived polyester polyols are produced under the name TERATE ® 200 series resin polyols. TERATE ® is a registered trademark owned by Hercules Incorporated, Wilmington, Del. As the viscosity of the product quasi-prepolymer is related, at least as a first approximation, to the viscosity of the DMT-derived polyester, those polyesters with lower viscosity are preferred. Suitable examples are TERATE ® 202, 203, and 204 resin polyols.

The DMT derived polyester polyols of the subject invention are all highly polar polyester polyols having a high weight percentage of aromatic character. Preferably, the hydroxyl number of suitable DMT derived polyester polyols is between 100 and 600, more preferably between 200 and 500, and particularly between 230 and 450.

The viscosities of suitable DMT derived polyols may vary considerably, but viscosities below about 20,000 cps at 25° C. are preferred. Generally, the lower the viscosity of the polyol, the lower the viscosity of the quasi prepolymer, although other effects such as the average polyol or isocyanate functionality may cause the viscosity to vary. Most preferable, therefore, are those DMT derived polyols having low viscosities. Viscosities in the range of 10,000 to 18,000 cps, for example are quite suitable.

Catalysis is generally not required to form the quasi-prepolymers, and it is undesirable to include non-removable catalysts whose residual catalytic effect would cause further polymerization leading to undesirable increases in viscosity during storage. However catalysts which do not promote the reaction of isocyanate groups with each other may be used, especially when the quasi-prepolymer is to be foamed within a short time.

Catalysts suitable for the preparation of the isocyanate-terminated prepolymers are, for example, the various alkyl tin carboxylates and tin carboxylates. Preferably used when catalysis is desired for example, are tin-(II) octoate, and dibutyl tin dilaurate. When catalysts are used, they may be present in amounts at from 0.005 to 2 percent by weight, preferably from 0.01 to 0.1 percent by weight. As indicated previously, preferably no catalyst is utilized.

To prepare the polyisocyanurate foams of the subject invention, the quasi-prepolymers must be mixed with suitable isocyanurate promoting catalysts, blowing agents, surface active agents (foam stabilizers), and optionally, other additives and auxiliaries known to those skilled in the art.

Suitable blowing agents are non-reactive, non-polar blowing agents. particularly the fluorochlorocarbon blowing agents. Particularly well suited for the practice of the subject invention are the halocarbon blowing agents generally used in the urethane foam art. These halocarbon blowing agents are available, for example under the trademarks Freon ® and Genetron ®. A table of suitable blowing agents may be found in U.S. Pat. No. 3,763,111.

The quasi-prepolymers of the subject invention are compatible with the blowing agents previously mentioned. The amount and type of blowing added will dictate many of the foam properties such as density, K-factor, and closed cell content. Generally, less than 30 percent by weight of blowing agent compared to total polymer weight is utilized. Preferably from 15–25 percent by weight at blowing agent is used. When the blowing agent is trichlorofluoromethane (Freon ® 11) approximately 20 percent by weight of blowing agent has been found to be especially useful.

The blowing agent is added to the quasi-prepolymer in the appropriate amount and mixed until it is dissolved. Surprisingly, the blowing agents do not show any tendency to separate even after prolonged storage and even in the absence of any added surfactant or solubilizer despite the exceptionally high polarity of the DMT polyols used to prepare the quasi-prepolymers. The ability to add the blowing agent to the quasi-prepolymer allows for simpler mixing heads with fewer feed streams to be used, and encourages the production of more uniform foam.

The addition of an isocyanuate promoting catalyst is necessary for the preparation of polyisocyanurate foams based on the quasi-prepolymers of the subject invention. These trimerization catalysts are well known to those skilled in the art. A great many catalysts are disclosed in the Journal of Cellular Plastics, December 1975, at page 329; and in U.S. Pat. Nos. 3,745,133, 3,896,052, 3,899,443, 3,903,018, 3,954,684, and 4,101,465.

Typical trimerization catalysts are glycine salts and strong organic bases such as the alkali metal carboxylates and tertiary amines. The amount of catalyst required will vary to some degree with the particular quasi-prepolymer and other foam system ingredients as well as the particular application. However catalyst amounts generally range from 0.1 parts to 20 parts by weight relative to the overall weight of product, preferably from 0.2 parts to 5 parts, and more particularly, 0.4 parts to 1 part.

A foam stabilizing agent is also generally required in producing the polyisocyanurate foams of the subject invention. Conventional foam stabilizing agents are useful, particularly the various polyether polysiloxanes. Suitable polyether polysiloxane stabilizers are described in U.S. Pat. No. 2,764,565. Particularly preferred are the polyoxyalkylene polyether polysiloxanes marketed by the Dow Corning Corporation as DC-193.

The preparation at the quasi-prepolymers of the subject invention is accomplished simply by reacting the isocyanate and DMT derived polyester polyol in a suitable reaction vessel, generally in an inert (nitrogen) atmosphere. The isocyanate is preferably heated to approximately 50° to 70° C. before addition of the DMT derived polyester, which is added gradually with stirring over a period of time generally between 15 minutes and several hours. A modest exotherm is allowed to develop and the temperature is increased to approximately 80° C. After holding for a period of time sufficient to assure complete reaction, the product is discharged.

The quantity of DMT derived polyester which it reacted with the isocyanate may vary, but generally is not more than 30 percent relative to the weight of the final quasi-prepolymer, and preferably than 20 percent or less. The stoichiometry must be such that sufficient equivalents of isocyanate are present to insure that the finished prepolymer will be isocyanate-terminated, as is well known to those skilled in the art. Examples of analogous formulations and their stoichiometrics may be found in *Polyurethanes: Chemistry and Technology*, volumes I and II, by Saunders and Frisch, published by Wiley-Interscience.

The polyisocyanurate foams of the subject invention may be prepared by a variety of methods known to those skilled in the art. Due to the fact that the blowing agent is incorporated into the quasi-prepolymer itself, a two stream mix is possible rather than the four or five stream mixes customarily utilized for isocyanurate foams. One feed stream to the mixing head may contain quasi-prepolymer, blowing agent, and foam stabilizer, while the second stream may contain the isocyanurate trimerization catalyst, generally dissolved in a low molecular weight polyol such as ethylene glycol, propylene glycol, diethylene glycol, dipropylene glycol, and the like. The two stream nature of the process allows for considerable flexibility with regard to adding other ingredients. For example, if it is desirable to introduce urethane linkages to modify the physical characteristics, a third stream containing a suitable polyol, generally a polyether or polyester polyol, may be utilized. Rather than add a third stream to the mixing head, an alternative is to add the additional polyol to the already existing catalyst feed stream. As this feed stream does not, of necessity, contain blowing agents, polyols which are not compatible with blowing agents, such as additional DMT derived polyester polyols may be added in this manner. Without the ability to incorporate the blowing agent in the quasi-prepolymer, this flexibility and simplicity in operation would not exist.

The polyisocyanurate foams of the subject invention show exceptionally low friability as compared to other true polyisocyanurate foams. Such foams typically have friabilities measured as weight loss by ASTM test method C-421 of from 25 percent to 100 percent. For this reason, the use of unmodified polyisocyanurate foams is seldom practical. Attempts to decrease the friability have generally involved adding various polyols to the reaction mixture, producing polyisocyanurate foams containing considerable urethane cross-linking. Polyether polyols have been most successful in this regard.

Examples of urethane modified polyisocyanurate foams having better than normal friability are given in several U.S. Patents. In U.S. Pat. No. 4,039,487, for example polyisocyanurate foams prepared from polymeric MDI, polyester polyols, and minor amounts of epoxy novolac resins are shown to have friabilities of from 18.8 percent to 63.1 percent with an average of 44.3 percent.

In U.S. Pat. No. 4,237,239, polyisocyanurate foams prepared from diphenylmethane diisocyanate enriched polymeric MDI, Terate ® polyester polyols, and minor amounts of a bisphenol A-derived epoxy resin had friabilities of from 3.0 percent to 30.4 percent with an average of 16.9 percent.

U.S. Pat. No. 4,092,276 allows a comparison between urethane-group containing polyisocyanurate foams prepared by the one-shot process and polyisocyanurate foams prepared from isocyanate-terminated quasi-prepolymers containing urethane linkages. In both cases the urethane groups are derived from polyether polyols. The foams prepared by the one shot process had friabilities ranging from 5 percent to 37 percent with an average of 17.5 percent. The foams prepared from quasi-prepolymers appeared to be comparable. with friabilities of from 6 percent to 25 percent and a average of 15.3 percent. The median friability in each case was approximately the same, 17 percent for the one-shot foams and 18 percent for the quasi-prepolymer foams. Thus the prior art quasi-prepolymer process even though deriving its urethane linkages thorough added polyether polyol, presented only marginal improvement while necessitating an additional process step, the synthesis of the quasi-prepolymer.

Since the comparison of urethane-group containing polyisocyanurate foams prepared by both conventioinal and quasi-prepolymer methods showed comparable friabilities, it was indeed surprising that the incorporation of the rather crude DMT derived polyester polyols into the quasi-prepolymer of the subject invention produced polyisocyanurate foams with exceedingly low friabilities compared with their conventionally processed analogues. The friabilities of the foams produced by the subject invention are below 20 percent, and typically 15 percent or less. By way of comparison, conventionally prepared foams show friabilities in excess of 50 percent. Preferably the friabilities of the foams of the subject inventions are less than 10 percent and most preferably, 5 percent or less. The examples which follow will serve to illustrate the process of the subject invention.

PREPARATION OF QUASI-PREPOLYMERS

EXAMPLE 1

A reaction vessel equipped with a stirrer, thermometer, addition funnel and an inlet for nitrogen gas was padded with nitrogen. 1356.5 grams of polymeric MDI was charged to the flask, stirring commenced, and the flask heated to 70° C. Terate ® polyester polyol 203, 149.6 g was added dropwise over a period of 30 minutes. Following heating for one hour at 80° C. the contents were allowed to cool to room temperature and discharged. The product had a free-NCO content of 25.86 percent by weight and a viscosity of 7150 cps at 25° C. A sample of the product was stored for two months following which the free-NCO content was found to be practically unchanged at 25.78 percent by weight, indicating excellent storage stability.

EXAMPLE 2

The procedure of Example 1 was followed utilizing 600 g of commercial 80:20 TDI and 150 g of Terate ® polyester polyol 203. The free-NCO content was 33.69 percent by weight with a viscosity of 134 cps at 25° C. After two months storage, the free-NCO content was only marginally less at 31.39 percent indicating good storage stability.

EXAMPLE 3

The procedure of Example 1 was followed utilizing 720 g of 80:20 TDI and 180 g Terate ® polyester polyol 203. The product had a free-NCO content of 33.23 percent and a viscosity of 124 cps at 25° C.

In the examples which follow, the following standard polyurethane and polyisocyanurate raw materials, catalysts, additives and auxiliaries were used:

Dabco ® 798—a tertiary amine catalyst available from Air Products Chemicals, Allentown, Pa.

Polycat ® 8—a tertiary amine catalyst available from Abbott Laboratories, North Chicago, Ill.

T-45 Catalyst—a potassium alkylhexanoate catalyst available from M & T Chemicals Inc., Rahway, N.J.

TDH Catalyst—1,3,5-tris(N,N-dimethylaminopropyl)-hexahydro-s-triazine

DC-193—a polyoxyethylene polyether polysiloxane available from Dow Corning Company, Midland, Mich, Goldschmidt B-8408—a polyethersiloxane available from Goldschmidt AG, Goldschmidt Str 100, 4300 Essen 1, Federal Republic of Germany Fyrol ® PCF—tris($\beta$-chloropropyl)phosphate available from Stauffer Chemicals, Westport, Conn.

PHT-4 diol—bis-(2-hydroxyethyl) phthalate

Polymeric MDI—LUPRANATE ® M-20 available from BASF Wyandotte Corporation, Parsippany, N.J.

Terate ® 203—transesterified crude DMT residue available from Hercules, Wilmington, Del.

Pluracol Polyol 975—a polyether polyol with functionality of approximately 4.4 and a hydroxyl number of 397 available from BASF Wyandotte Corporation, Parsippany, N.J.

PREPARATION OF POLYISOCYANURATE FOAMS

EXAMPLE 4

Two formulations were foamed by conventional foaming techniques. Formulation B utilized the quasi-prepolymer of Example 1 while Formulation A was similar in every respect except that instead of the quasi-prepolymer of the subject invention, equivalent amounts of polymeric MDI and Terate ® 203 were utilized. The formulations and the physical properties of the foams are given below. All parts are by weight

TABLE I

| Formulation | A | B |
|---|---|---|
| Quasi-prepolymer | — | 330 |
| Polymeric MDI | 300 | — |
| Terate ® 203 | 30 | — |
| Freon 11A | 60 | 60 |
| DC 193 | 6 | 6 |
| T-45 Catalyst | 2 | 2 |
| TDH Catalyst | 3 | 3 |
| Properties | | |
| Density, lbs/ft³ | 1.8 | 1.9 |
| K-factor | | |
| initial | 0.173 | 0.163 |
| aged 10 days at 140° C. | 0.217 | 0.191 |
| Friability, wt. loss, % | 61 | 15 |

Table I demonstrates the unexpected decrease in friability when using the quasi-prepolymers of the subject invention. A further unexpected advantage is the proportionately lesser increase in K-factor with age.

URETHANE GROUP CONTAINING POLYISOCYANURATE FOAMS

Foams were made from two quasi-prepolymers prepared in accordance with Example 1 and having free-NCO contents of 28.4 percent (C) and 25.4 percent (D).

TABLE II

| Formulation | C | D |
| --- | --- | --- |
| Pluracol Polyol 975 | 40.0 | 40.0 |
| TERATE ® 203 | 25.4 | 25.4 |
| PHT-4 diol | 35.0 | 35.0 |
| Goldschmidt B-8408 | 2.0 | 2.0 |
| Polycat 8 | 0.4 | 0.4 |
| Dabco 798 | 1.2 | 1.2 |
| Quasi-Prepolymer | 133.0 | 149.0 |
| F-11A | 46.0 | 49.0 |
| NCO/OH ratio | 1.60/1 | 1.60/1 |
| Physical Properties | | |
| Density, lb/ft$^3$ | 2.01 | 2.02 |
| K-factor | | |
| initial | .119 | .117 |
| aged 10 days at 140° C. | .144 | .138 |
| Friability, wt loss % | 2.7 | 1.7 |

The embodiments of the invention in which an exclusive property or privilege is claimed are defined as follows:

1. An isocyanate-group terminated quasi-prepolymer prepared by the process of reacting an organic polyisocyanate with a polyester polyol which is derived from DMT process residue by transesterification with a low molecular weight aliphatic diol.

2. The quasi-prepolymer of claim 1 wherein said organic polyisocyanate is selected from the group consisting of toluene diisocyanate, diphenylmethane diisocyanate, and polymeric MDI.

3. The quasi-prepolymer of claim 2 wherein said polyester polyol is utilized in an amount of from 2 to 30 percent by weight relative to the total quasi-prepolymer weight.

4. A low friability polyisocyanurate foam prepared by the trimerization of the quasi-prepolymer of claim 1 in the presence of a trimerization catalyst, a blowing agent, auxiliaries and additives.

5. A low friability polyisocyanurate foam prepared by the trimerization of the quasi-prepolymer of claim 3 in the presence of a trimerization catalyst, blowing agent, auxiliaries and additives.

6. The polyisocyanurate foam of claim 5 wherein said friability is less than about 20 percent by weight as measured by ASTM test method C-421.

7. The polyisocyanurate foam of claim 5 wherein said friability is less than about 15 percent by weight as measured by ASTM test method C-421.

8. A low friability urethane group-containing polyisocyanurate foam prepared by the process comprising
   (a) reacting the quasi-prepolymer of claim 1 with
   (b) A polyol selected from the group consisting of polyether polyols, hydroxyl-functional polyester polyols, and hydroxyl-functional polyesterether polyols;
in an equivalent ratio of isocyanate groups to hydroxyl groups in excess of 1.5:1 in the presence of isocyanurate-group and urethane-group promoting catalysts, a non-reactive blowing agent, and suitable additives and auxiliaries.

9. The foam of claim 8 wherein said friability is less than about 15 percent as measured by ASTM test method C-421.

10. The foam of claim 9 wherein said friability is less than about 10 percent as measured by ASTM test method C-421.

11. The foam claim 10 wherein said friability is less than about 5 percent as measured by ASTM test method C-421.

12. The foam claim 11 wherein said polyisocyanate is polymeric MDI.

13. The foam of claim 11 wherein said polyisocyanate is toluene diisocyanate.

* * * * *